United States Patent [19]
Lees

[11] Patent Number: 5,264,525
[45] Date of Patent: Nov. 23, 1993

[54] INITIATOR COMPOSITIONS FOR TWO PART ACRYLIC ADHESIVES

[75] Inventor: William A. Lees, Romsey, England

[73] Assignee: National Starch and Chemical Investment Holding Corporation, Wilmington, Del.

[21] Appl. No.: 935,489

[22] Filed: Aug. 25, 1992

Related U.S. Application Data

[60] Division of Ser. No. 279,289, Nov. 30, 1988, abandoned, which is a continuation of Ser. No. 901,666, Aug. 28, 1986, abandoned.

[51] Int. Cl.$^5$ ............................ C08K 5/07; C09K 3/00
[52] U.S. Cl. ................................ 525/154; 252/182.15; 252/182.17; 252/182.18; 252/182.26; 525/153; 525/157; 525/240; 525/245; 525/259; 525/265; 525/301
[58] Field of Search ............... 525/201, 153, 154, 157, 525/240, 245, 259, 265, 301; 252/182.15, 182.17, 182.18, 182.26

[56] References Cited

U.S. PATENT DOCUMENTS

| | | | |
|---|---|---|---|
| 3,026,285 | 3/1952 | Hirosawa et al. | 260/45.2 |
| 3,291,775 | 12/1966 | Holm | 528/107 |
| 3,468,830 | 9/1969 | Kiss | 525/510 |
| 3,539,659 | 11/1970 | Deholf | 525/510 |
| 3,546,169 | 12/1970 | Cole | 528/107 |
| 3,591,438 | 7/1971 | Toback et al. | 156/310 |
| 3,600,362 | 8/1971 | Hirosawa | 525/510 |
| 3,890,407 | 6/1975 | Briggs, Jr. et al. | 260/878 R |
| 3,962,372 | 6/1976 | Ashart | 260/878 R |
| 3,994,764 | 11/1976 | Wolinski | 156/218 |
| 4,081,491 | 3/1978 | Bauer | 525/510 |
| 4,112,013 | 9/1978 | Briggs, Jr. et al. | 260/878 R |
| 4,118,436 | 10/1978 | Craven | 260/853 |
| 4,287,106 | 9/1981 | Forgo et al. | 525/305 |
| 4,575,917 | 5/1985 | Yamamoto et al. | 524/178 |
| 4,581,422 | 4/1986 | Speranza | 525/510 |
| 4,674,142 | 3/1986 | Charnock | 525/305 |

FOREIGN PATENT DOCUMENTS

| | | |
|---|---|---|
| 0044166 | 1/1982 | European Pat. Off. . |
| 0071197 | 2/1983 | European Pat. Off. . |
| 1244858 | 9/1971 | United Kingdom . |
| 1347981 | 2/1974 | United Kingdom . |
| 2039507 | 8/1980 | United Kingdom . |
| 2088368 | 6/1982 | United Kingdom . |

*Primary Examiner*—Kriellion S. Morgan
*Attorney, Agent, or Firm*—Ellen T. Dec

[57] ABSTRACT

A high volume amine-aldehyde initiator composition for two part acrylic adhesives is disclosed comprising a mixture of the amine-aldehyde condensate and a diluent comprising an epoxy ether, e.g. the diglycidyl ether of bisphenol A. The initiator compositions are designed for use in dispensing two part acrylic adhesives from self-proportioning twin pack cartridge dispensers at adhesive:initiator ratios of 20:1 or less, e.g. 10:1.

9 Claims, No Drawings

INITIATOR COMPOSITIONS FOR TWO PART ACRYLIC ADHESIVES

This application is a division of application Ser. No. 07/279,289, filed Nov. 30, 1988 now abandoned, which is a continuation application of Ser. No. 06/901,666 filed on Aug. 28, 1986, now abandoned.

FIELD OF INVENTION

This invention relates to initiator compositions for use in two part acrylic adhesive and sealant systems.

BACKGROUND

In the application of two part acrylic adhesives, the monomeric component, i.e. comprising the polymerisable acrylic monomer, the catalyst, and the optional ingredients, e.g. stabilizers, antioxidants, polymerisation inhibitors and toughening agents such as chlorosulphonated polyethylene or low molecular weight reactive elastomers such as a vinyl-terminated polybutadiene/acrylonitrile, and the initiator component, usually comprising an amine/aldehyde condensate, are usually applied separately each to a different one of the two surfaces to be joined, the two surfaces then being brought together and clamped whilst the adhesive cures, the cure being initiated by contact between the superimposed layers or films of primer, i.e. the initiator, and the monomeric component. In an alternative technique, the primer and the monomeric component can be applied both to the same surface, or to both surfaces, before those surfaces are brought into contact. Whilst such techniques are satisfactory when applying the adhesive between closely mating surfaces, i.e. with gap widths between the mating surfaces of the order of 0.05 mm or less, such techniques are not so successful in the sealing or bonding of larger gaps, i.e. greater than about 0.25 mm, due to a non-uniformity of cure, or poor "cure through". In this connection, in certain industries, for example, the vehicle manufacturing industry, gap sizes of 3 to 4 mm are commonplace and cannot presently be sealed, at least not satisfactorily, with conventional acrylic adhesives.

To overcome the problem of poor cure through on larger gap sizes, the acrylic monomer component and the initiator component can be pre-mixed immediately prior to application or injection of the adhesive, and for this purpose dual adhesive applicators and injection devices, e.g. self-proportioning, twin pack cartridge dispensers, have been developed, not exclusively in the field of acrylic adhesives and sealants, but in other adhesive fields as well, for the simultaneous ejection and mixing of the two components in predetermined proportions.

However, such self-proportioning, twin pack cartridge dispensers present a further problem in that, for accurate proportioning of the two components the relative proportions of the two components, on a volume basis, must not be greater than about 10:1. Traditional two part acrylic adhesive compositions are, however, used at much higher ratios, for example, at volume ratios of the order of 50:1 or more, i.e. the volume ratio of the acrylic monomer component to the initiator component.

PRIOR ART

Typical two part acrylic adhesives of the type to which the present invention relates are disclosed in U.S. Pat. Nos. 3,890,407, 3,962,372, 3,994,764, 4,112,013 and 4,118,436, and in EP-A-0 044 166, the contents of which are incorporated herein by reference. Typical amine-aldehyde initiators are disclosed in U.S. Pat. No. 3,591,438 incorporated herein by reference.

OBJECT OF THE INVENTION

The object of the present invention is to provide a diluent or bulking agent for the amine-aldehyde condensate used in such initiators for two part acrylic adhesives which enables the initiator volume to be increased, with consequent lower injection or mixing ratios, but which, at the same time, does not adversely affect the properties of the cured adhesive, or for that matter the properties, e.g. the activity of the initiator.

A further object is to provide a high volume initiator composition for two part acrylic adhesives.

A further object is to provide two part acrylic adhesive compositions incorporating a high volume initiator composition.

A further object is to provide a method of applying a two part adhesive composition in which the acrylic adhesive component and the initiator component are premixed at a relatively high adhesive:initiator ratio.

SUMMARY OF THE INVENTION

Surprisingly, it has now been found that epoxy resins such as the diglycidyl ether of bisphenol A, are satisfactory bulking agents for such initiators, such mixtures showing no sign of premature gellation in accelerated storage tests, which is surprising in view of the high reactivity of both the initiator and the bulking agent. Also it has been found that the incorporation of relatively large amounts of epoxy resin into the adhesive formulation via the initiator does not adversely affect the bond strength, indeed initial experiments show an increase in bond strength using such bulked initiators.

STATEMENT OF INVENTION

In accordance with one aspect of this invention, therefore, there are provided amine-aldehyde condensate compositions, referred to as initiator compositions herein and capable of initiating the free radical polymerization of acrylic adhesives, for use with two part acrylic adhesives and comprising in admixture with the amine-aldehyde condensate, from 10 to 90% by weight based on the total composition, of an epoxy resin. The amine-aldehyde content of the initiator composition will usually be in the range 5 to 50% by weight based on the total composition, preferably 15 to 30%, the balance, if any, comprising optional ingredients such as fillers, antioxidants, stabilizers, polymerisation inhibitors, viscosity modifiers etc. The initiator composition may also, as is known, contain a proportion of the monomer component. Other aspects of the invention will become apparent as the description proceeds.

DETAILED DESCRIPTION

The bulking agents or diluents used in the initiator compositions of this invention are, as indicated, epoxy resins, that is to say condensates of epichlorohydrin with a polyhydric material, e.g. ethylene glycol, glycerol, bisphenol A, bisphenol F and other polyhydric phenols and phenol condensates. Such epoxy resins are extensively used in their own right as adhesive compositions and in which they are cured by reaction with a cross-linking or curing agent, frequently a primary amine, usually an aliphatic polyamine, but occasionally an aromatic polyamine, hence the surprise that these epoxy resins can be admixed with amine-aldehyde condensates at temperatures up to 50° C. without premature gellation and without any apparent reduction in the initiator activity of the amine-aldehyde condensate. Usually the epoxy resins used as bulking agents or diluents in accordance with this invention will be liquid resins with molecular weights up to about 600, although solid, low melting point resins can be used in the presence of a suitable cosolvent for the resin and the amine-aldehyde initiator. The preferred bulking agents or diluents for use in the compositions of this invention are the diglycidyl ether of bisphenol A and the glycidyl ethers of phenol-formaldehyde resins, e.g. the resins sold under the name NOVALAC.

The amine-aldehyde condensates used as the initiator component in the compositions of this invention are conventional amine-aldehyde condensates of the type described, for example, in the above listed U.S. patents and more particularly in U.S. Pat. No. 3,591,438, incorporated herein by reference. Typical amines used in the preparation of such condensates are secondary aliphatic or aromatic mono amines having 1 to 18 carbon atoms such as ethylamine, butylamines, pentylamines, cyclopentylamine, hexylamines, cyclohexylamine, dodecylamine, aniline, tolylamine and xylylamine, and typical aldehydes are aliphatic aldehydes containing from 1 to 12 carbon atoms such as acetaldehyde, propionaldehyde, butyraldehyde, crotonaldehyde, acrolein, hydrocinnamaldehyde etc. The preferred initiators for use in this invention are VANAX 808, a condensate of aniline and butyraldehyde and VULKACIT 576, a condensate of homologous acroleins and aromatic amines.

A variety of optional components such as thickeners, fillers, polymerisation inhibitors, antioxidants, viscosity modifiers, etc. may be incorporated into the initiator compositions of this invention, including inert particulate fillers and thickeners such as finely divided silica powder. Such additives are largely conventional and do not need to be further described. Also the initiator compositions may contain a proportion of the acrylic monomer, e.g. an acrylate ester such as methyl methacrylate.

The bulked initiator compositions of this invention are particularly designed for use with toughened two part acrylic adhesives and sealants containing an elastomer, preferably chlorosulphonated polyethylene, as a toughening agent. Other suitable toughening agents include styrenebutadiene block copolymers, polyurethanes, vinyl- or carboxy-terminated butadiene/acrylonitrile copolymers, i.e. the so-called HYCAR rubbers, and others.

Acrylic adhesive compositions of this general type are disclosed in U.S. Pat. Nos. 3,890,407, 3,962,372, 4,112,013 and 4,118,436, and in EP-A-0 044 166, the disclosures of which are incorporated herein by reference.

The principal polymerisable component of such two part acrylic adhesive compositions may be any of the acrylate or methacrylate esters mentioned in the publications previously referred to, optionally and usually in admixture with acrylic and/or methacrylic acid as an adhesion promoter. Thus typical acrylic monomers for use in this invention are alkyl, cycloalkyl, alkoxyalkyl and hydroxyalkyl acrylates and methacrylates, and alkylene and polyalkylene diacrylates and dimethacrylates. Specific examples are: $C_1$-$C_8$ alkyl acrylates and methacrylates, particularly methyl, ethyl, propyl, n-butyl, isobutyl and ethylhexyl methacrylates, $C_2$-$C_3$ hydroxyalkyl acrylates and methacrylates, particularly hydroxyethyl methacrylate, $C_1$-$C_5$ alkoxy ($C_1$-$C_5$) alkyl methacrylates e.g. ethoxyethyl methacrylate, lauryl methacrylate, tetrahydrofurfuryl methacrylate, isobornyl methacrylate, and poly ($C_2$-$C_3$) alkylene dimethacrylates, e.g. triethyleneglycol dimethacrylate. Particularly preferred acrylic monomer combinations for use in this invention are combinations of (a) an acrylate ester selected from one or more of the following: methyl methacrylate, isobornyl methacrylate, 2-ethoxyethyl methacrylate, tetrahydrofurfuryl methacrylate and triethyleneglycol dimethacrylate, and (b) methacrylic acid.

Although chlorosulphonated polyethylene is the preferred toughening agent, other polymers may also be used, for example, polychloroprene or an elastomer, such as acrylonitrile/butadiene or styrene/butadiene, which contains terminal or pendant sulphonyl chloride ($-SO_2Cl$), carboxy, vinyl or methacrylic groups. Amounts of toughening agent may range from 5 to 50% by weight, based on the weight of monomer, more usually 10 to 35%.

Included in the monomeric component will be a free radical initiator system, capable when the two components are mixed, of initiating the free radical polymerisation of the monomer component. Usually the free radical initiator system will include an organic peroxide or hydroperoxide, or an organic peracid or perester. Typical and preferred peroxy compounds are cumene hydroperoxide and t-benzyl benzoate, although a wide variety of other peroxy compounds can be used. Such peroxy compounds will usually, but not necessarily, be used in combination with one or more tertiary amines and/or promoters such as copper or cobalt naphthenate to complete the initiator system.

Also, as previously indicated the bulked initiator compositions of this invention are particularly designed for use in self-proportioning, twin cartridge type adhesive applicators, but other methods of applying the initiator, in admixture with, or separately from the adhesive, e.g. as a primer can be used. Depending on the apparatus used, and the particular compositions used, the acrylic monomer component and the bulked initiator can be used or premixed at a variety of different volume ratios, for example, at a volume ratio of 20:1 or lower and preferably at about 10:1.

One of the particular benefits which has been noted in the use of the bulked initiator systems of this invention, is a reduction of the exotherm during the curing of the adhesive. This enables one to apply relatively thick layers of adhesive, e.g. 3 to 4 mm or more, without risking undue exothermic heating of the mix with possible adverse consequences on the final bond, due, for example, to the boiling off of monomer which occurs if the exotherm causes an excessive rise in temperature.

Other advantages to be noted are reduced odour, good shelf stability, good working times and a marked lack of sensitivity to the mix ratio of monomer to initiator.

The invention is illustrated by the following Examples.

EXAMPLE 1

In this example a two part acrylic adhesive system (System B) was prepared comprising as the first part:

| | |
|---|---|
| methyl methacrylate | 56.2% by weight |
| methacrylic acid | 10.0% by weight |
| chlorosulphonated polyethylene | 33.3% by weight |
| cumene hydroperoxide | 0.5% by weight | and as the second part:

| | |
|---|---|
| amine/aldehyde initiator (Vanax* 808) | 20.0% by weight |
| diglycidyl ether of bisphenol A | 76.5% by weight |
| fumed silica | 2.5% by weight |
| polyethyleneglycol (m.w. 200) | 1.0% by weight |

*commercially available condensate of butyraldehyde and aniline sold by R. T. Vanderbilt Co., Inc. Connecticut.

For a comparison a second, conventional two part acrylic adhesive system (System A) was prepared comprising as the first part:

| | |
|---|---|
| methyl methacrylate | 51.4% by weight |
| methacrylic acid | 10.0% by weight |
| chlorosulphonated polyethylene | 33.3% by weight |
| diglycidyl ether of bisphenol A | 4.8% by weight |
| cumen hydroperoxide | 0.5% by weight | and as the second part:

| | |
|---|---|
| amine/aldehyde condensate Vanax 808 | 100% |

In a comparative test procedure the bond strengths of System A and System B were compared both on polyvinyl chloride substrates and steel substrates. In applying System A, the initiator was painted onto one surface in a conventional manner, and the monomeric component applied as a bead on the other. The two were then brought together and clamped until handling strength was achieved. In applying System B, the monomeric component and the initiator component were premixed in a volume ratio of 10:1 and applied between the two surfaces, which were then clamped together until handling strength was achieved. The following test results were obtained:

| | System A | System B |
|---|---|---|
| Time to handling strength on PVC | 75s | 60s |
| Time to handling strength on steel | 165s | 135s |
| Ultimate strength Impact J | 47.4 | 48.2 |
| Ultimate strength Shear MPa | 24.7 | 26.8 |
| Ultimate strength Peel N/25 mm | 152 | 179 |

As will be seen System B performs marginally better than System A.

In a separate accelerated ageing test, the initiator composition of System B was held at 50° C. for a prolonged period. No gellation occured, and the initiator retained its activity even after 28 days, indicating a substantial shelf-life under normal, room temperature storage conditions.

EXAMPLE 2

A bulked initiator composition according to this invention was prepared having the formulation:

| | |
|---|---|
| diglycidyl ether of bisphenol A (DOW 331) | 76.5% by weight |
| amine-aldehyde condensate (VULKACIT 576: a commercially available initiator comprising a condensation product of homologous acroleins and aromatic amines) | 20.0% by weight |
| finely divided silica (WALKER HDK N20) | 2.5% by weight |
| polyethyleneglycol (m.w. 200) | 1.0% by weight |

The bulked initiator composition was premixed at a volume ratio of 10:1 (monomeric component:initiator) with an acylic adhesive formulation as follows:

| | |
|---|---|
| isobornyl methacrylate | 19.60% by weight |
| 2-ethoxyethyl methacrylate | 36.20 by weight |
| methacrylic acid | 9.80% by weight |
| triethyleneglycol dimethacrylate | 1.00% by weight |
| chlorosulphonated polyethylene (HYPALON 20) | 30.80% by weight |
| butylated hydroxy toluene | 1.04% by weight |
| oxalic acid | 0.01% by weight |
| cumene hydroperoxide | 0.52% by weight |
| δ-glycidoxypropyltrimethyl silane | 1.03% by weight | and the bond strengths obtained at various thicknesses compared with a conventional two part acrylic adhesive applied using a conventional initiator VANAX 808 (an aniline-butyraldehyde condensate) applied as a separate primer to the substrate to be bonded in a conventional manner. The adhesive formulation used was:

| | |
|---|---|
| isobornyl methacrylate | 19.00% by weight |
| 2-ethoxyethyl methacrylate | 34.26 by weight |
| methacrylic acid | 9.52% by weight |
| triethyleneglycol dimethacrylate | 0.95% by weight |
| diglycidyl ether of bisphenol A (DOW 331) | 4.76% by weight |
| chlorosulphonated polyethylene (HYPALON 20) | 30.00% by weight |
| butylated hydroxy toluene | 1.00% by weight |
| cumene hydroperoxide | 0.50% by weight |
| oxalic acid | 0.01% by weight |

Dow 331 represents a liquid epoxy resin having a viscosity of 11,000 to 14,000 cps at 25° C. sold by Dow Chemical Company as D.E.R. ® 331. Vulkacit 576 is a condensate of aromatic amines and homologous acroleins sold by Bayer AG, K. A. Division, West Germany. Hypalon ® 20 is a chlorosulfonated polyethylene containing 29% chlorine and 1.4% sulfur sold by E. I. duPont de Nemours and Co., Inc.

The results obtained are as follows:

| | Conventional Initiator | Bulked Initiator |
|---|---|---|
| Handling time in minutes on steel | 2 | 2 |
| Impact strength, steel, .05 mm bond line | 150 kg. f. cm. | 200 kg. f. cm. |
| Shear strength, steel, .05 mm bond line | 18 MNm$^{-2}$ | 17.7 MNm$^{-2}$ |
| Peel strength, aluminium, .05 mm bond line | 100 N/25 mm | 130 N/25 mm |
| Peel strength, aluminium, .25 mm bond line | 70 N/25 mm | 160 N/25 mm |
| Peel strength, aluminium, 3 mm bond line | — | 180 N/25 mm |
| Durability on alum-    Original strength | 19.3 | 19.6 |

| | | Conventional Initiator | Bulked Initiator |
|---|---|---|---|
| inium-lithium alloy, lap shear MNm$^{-2}$ | After 2000 h salt spray | 8.4 | 13.3 |
| | After 2000 h 40° C. 95% R.H. | 15.1 | 16.3 |

These results indicate the similar performance of the two systems on thin bond lines and the superior performance of the bulked initiator system on thick bond lines. The durability of the pre-mix system is at least as good if not superior to that of the conventional system.

Accelerated ageing tests at 50° C. on the bulked initiator showed no loss of activity or signs of gellation after 28 days. This would indicate the storage life of the initiator to be well in excess of 1 year under normal conditions and is excellent.

EXAMPLE 3

Using the same bulked initiator composition and the same adhesive formulation as in Example 2, further tests have been carried out to determine the effect of the open time, i.e. the time between mixing the adhesive and the initiator and the assembly of the joint, on the time taken to obtain handling strength and the ultimate bond strength of the joint. The adhesive and initiator were premixed at a volume ratio of 10:1. The results obtained are as follows:

| Open Time (Minutes) | Handling Time (Minutes) | Peel Strength on Abraded Aluminium N/25 mm |
|---|---|---|
| 0 | 1.75 | 102 |
| 1 | 1.75 | |
| 2 | 1.75 | 110 |
| 3 | 1.75 | |
| 4 | 1.75 | 116 |
| 5 | 1.75 | |
| 6 | 1.75 | 122 |
| 8 | (not measured) | 124 |
| 10 | (not measured) | 126 |
| 12 | (not measured) | 127 |

These results clearly show that the handling time is completely independent of open time, at least up to 6 minutes open time, and that the mixed adhesive has a quite considerable usable working life (i.e. time between mixing and assembly) with open times up to 12 minutes actually showing an increase in ultimate bond strength.

Still using the same adhesive and the same bulked initiator, further tests have been carried out using different proportions of adhesive and initiator. The results obtained are as follows:

| Volume Ratio Adhesive:Initiator | Peel Strength on Abraded Aluminium N/25 mm |
|---|---|
| 7.5:1 | 145 |
| 9.0:1 | 145 |
| 10.0:1 | 162 |
| 11.0:1 | 135 |
| 12.5:1 | 139 |

These results demonstrate that using the thickened initiator compositions of this invention, the ultimate bond strength is relatively independent of monomer-:initiator ratio. This relative insensitivity to mix ratio is of obvious commercial benefit, since accurate proportioning of the two components is not required.

EXAMPLE 4

Using the same bulked initiator as in Example 2, further tests have been carried out using the initiator pre-mixed with a different acrylic adhesive formulation at a volume ratio (monomer:initiator) of 10:1. The adhesive formulation in this case was:

| methyl methacrylate | 35.73% by weight |
|---|---|
| triethyleneglycol dimethacrylate | 0.95% by weight |
| epoxidised dicyclopentenyl methacrylate | 15.00% by weight |
| butylated hydroxy toluene | 0.20% by weight |
| chlorosulphonated polyethylene (HYPALON 20) | 33.34% by weight |
| diglycidyl ether of bisphenol A (DOW 331) | 4.76% by weight |
| methacrylic acid | 9.52% by weight |
| cumene hydroperoxide | 0.50% by weight |

The following results have been obtained:

| Shear strength, steel, MNm$^{-2}$ | 32.3 |
|---|---|
| Impact strength, steel, kg. f. cm. | >500 |
| Peel strength, aluminium, N/25 mm | 170 |

These figures confirm that the initiator is capable of giving exceptionally high bond strengths, i.e. the use of the epoxy resin in the initiator system does not interfere significantly with the product performance.

EXAMPLE 5

Bulked initiator compositions of the same formulation as in Example 2 were prepared but replacing the epoxy resin (DOW 331) with an equivalent amount of (a) the reaction product of DOW 331 and a carboxy terminated butadiene/acrylonitrile copolymer (HYCAR CTBN) as a result of which all the epoxy groups were eliminated, and (b) an epoxy novalac resin (DEN 438), i.e. a glycidyl ether of a phenol-formaldehyde condensate of the general formula:

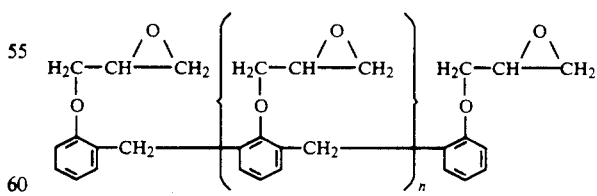

EEW (Epoxy equivalent weight)=180 g. Average value for n=1.6.

Hycar ® CTBN is a carboxy terminated reactive liquid butadiene/acrylonitrile copolymer sold by B. F. Goodrich. DEN 438 represents an epoxy novalac resin having a viscosity of 20,000 to 50,000 cps at 52° C. sold by Dow Chemical Company as D.E.N. 438.

Using the same adhesive formulation as in Example 2 at the same 10:1 premixed ratio the following results were obtained.

| | Initiator Composition of Example 2 | Initiator Composition with DEN 438 | Initiator Composition with DOW 331/ HYCAR CTBN reaction product |
|---|---|---|---|
| Shear strength, steel, room temperature, MNm$^{-2}$ | 17.4 | 15.7 | 3.9 |
| Peel strength, aluminium N/25 mm | 140 | 157 | 5 |

These results illustrate the utility of a different epoxy resin as the bulking agent for the initiator system, and the importance of using as the bulking agent an epoxy resin with its epoxy groups intact.

I claim:

1. A two part acrylic adhesive composition comprising a monomeric component comprising one or more acrylate esters containing a free radical catalyst system, and an initiator component comprising a substantially unreacted admixture of from 5 to 50% by weight, based on the weight of the initiator component of a monoamine aldehyde condensate capable of initiating the free radical polymerization of said monomeric component when mixed therewith, and a bulking agent or diluent for said condensate comprising an epoxy resin in an amount of from 10 to 90% by weight, based on the total weight of the initiator component.

2. An adhesive composition according to claim 1, which is a toughened acrylic adhesive containing an elastomeric toughening agent in admixture in said monomeric component.

3. An adhesive composition according to claim 1, wherein the toughening agent is a chlorosulphonated polyethylene.

4. A composition according to claim 3, wherein the epoxy ether component of the initiator composition is the diglycidyl ether of bisphenol A.

5. In a method of applying a two part acrylic adhesive composition to a substrate which comprises premixing a monomeric component containing a polymerisable acrylate ester and in admixture therewith, a free radical polymerisation catalyst system, and an initiator component comprising a monoamine aldehyde condensate capable of initiating the free radical polymerization of said monomeric component when mixed therewith and applying the mixed adhesive to the substrate to be bonded, the improvement which comprises using as the initiator component a bulked mixture comprising said monoamine aldehyde condensate and a bulking agent for said condensate comprising an epoxy resin in an amount of from 10 to 90% by weight, based on the total weight of the initiator component.

6. A method according to claim 5, wherein the monomeric component and the initiator component are premixed at a volume ratio of 20:1 or less.

7. A method according to claim 6 wherein said ratio is about 10:1.

8. A method according to claim 5 wherein the adhesive is applied as a bead having a thickness of at least 0.25 mm.

9. An acrylic adhesive composition according to claim 1 wherein the acrylate monomeric component and the initiator component are separately packaged for use in a self-proportioning twin-pack cartridge adhesive dispenser.

* * * * *